(12) United States Patent
Groezinger et al.

(10) Patent No.: US 11,630,548 B2
(45) Date of Patent: Apr. 18, 2023

(54) UNRESTRICTED CURSOR POSITIONING IN MULTI-DISPLAY ENVIRONMENT

(71) Applicant: KYNDRYL, INC., New York, NY (US)

(72) Inventors: Frank Groezinger, Dornhan (DE); Joachim Frank, Tuebingen (DE)

(73) Assignee: Kyndryl, Inc., New York, NY (US)

( * ) Notice: Subject to any disclaimer, the term of this patent is extended or adjusted under 35 U.S.C. 154(b) by 76 days.

(21) Appl. No.: 17/037,922

(22) Filed: Sep. 30, 2020

(65) Prior Publication Data

US 2022/0100325 A1    Mar. 31, 2022

(51) Int. Cl.
*G06F 3/048* (2013.01)
*G06F 3/0481* (2022.01)
*G06F 3/14* (2006.01)

(52) U.S. Cl.
CPC .......... *G06F 3/0481* (2013.01); *G06F 3/1438* (2013.01); *G06F 3/048* (2013.01)

(58) Field of Classification Search
None
See application file for complete search history.

(56) References Cited

U.S. PATENT DOCUMENTS

| | | | |
|---|---|---|---|
| 5,923,307 A * | 7/1999 | Hogle, IV | G06F 3/04897 345/1.3 |
| 6,018,340 A | 1/2000 | Butler | |
| 6,211,879 B1 * | 4/2001 | Soohoo | G06F 3/0485 715/854 |
| 2006/0033712 A1 * | 2/2006 | Baudisch | G06F 3/1446 345/157 |
| 2006/0038741 A1 * | 2/2006 | Mori | G06F 3/0481 345/1.1 |
| 2016/0378295 A1 * | 12/2016 | Cousins | G06F 3/1423 715/702 |
| 2018/0107632 A1 * | 4/2018 | Blinn | G06F 3/0481 |
| 2020/0133459 A1 * | 4/2020 | Bender | G09G 5/08 |

OTHER PUBLICATIONS

Written Option of the International Searching Authority from PCT Application No. PCT/EP2021/072370 dated Nov. 22, 2021, 8 pages.

(Continued)

*Primary Examiner* — Xuyang Xia
(74) *Attorney, Agent, or Firm* — Dan Housley; Andrew M. Calderon; Calderon Safran & Cole, P.C.

(57) ABSTRACT

A method for controlling a mouse pointer on at least two displays is provided. A virtual display layout defines a mutual relative positioning of display areas relating to the at least two displays. The method comprises creating the virtual display area and tracking a position of the mouse pointer within it. Upon the mouse pointer being positioned within an area of any of the display areas, the mouse pointer is displayed. Upon the mouse pointer being positioned outside the area of any of the display areas, but within the virtual display area, a first marker is displayed on a side border of the display in a direction the mouse pointer is positioned within the virtual display area, and a second marker is displayed on at least one other side border of another display in a direction the mouse pointer is positioned within the virtual display area.

20 Claims, 10 Drawing Sheets

(56) References Cited

OTHER PUBLICATIONS

"ATEN Boundless Switching—Intuitive Mouse Switching Solution for Any-Scale Multi-system Environments," ATEN Corporate Headquarters, accessed Mar. 12, 2020, 20 pages. <https://www.aten.com/global/en/product-landing-page/boundless-switching/>.
"Dual Display Mouse Manager," DDMM, accessed Sep. 15, 2020, 1 page. <http://ddmm.sourceforge.net/>.
"Have mouse move proportionately between two screens? [duplicate]," Stack Exchange Network, accessed Sep. 15, 2020, 3 pages. <https://superuser.com/questions/793787/have-mouse-move-proportionately-between-two-screens>.
"Line-line intersection," Wikipedia, access Sep. 15, 2020, 7 pages. <https://en.wikipedia.org/wiki/Line%E2%80%93line_intersection>.
"Little Big Mouse," GitHub, accessed Sep. 15, 2020, 2 pages. <https://github.com/mgth/LittleBigMouse>.
"Move mouse proportionaly between different resolution (and DPI) displays," Stack Exchange Network, accessed Sep. 15, 2020, 3 pages.
"Virtual Screen Coordinates," The Joseph M. Newcomer Co., May 14, 2011, 9 pages. <http://www.flounder.com/virtual_screen_coordinates.htm>.
Baudisch et al., "Mouse Ether: Accelerating the Acquisition of Targets Across Multi-Monitor Displays," CHI 2004, Apr. 24-27, 2004, 4 pages. <https://www.researchgate.net/publication/2918750_Mouse_Ether_Accelerating_the_Acquisition_of_Targets_Across_Multi-Monitor_Displays>.
Benko et al., "Multi-Monitor Mouse," CHI 2005, Apr. 2-7, 2005, 4 pages, <https://www.microsoft.com/en-us/research/uploads/prod/2016/12/Multi-Monitor-Mouse.pdf>.
Benko et al., "Pointer Warping in Heterogeneous Multi-Monitor Environment," Graphics Interface Conference, May 28-30, 2007, pp. 111-117. <https://www.researchgate.net/publication/221474723_Pointer_warping_in_heterogeneous_multi-monitor_environments>.
Fortmann et al., "Assisting Mouse Pointer Recovery in Multi-Display Environments," Mensch und Computer 2015 Tagungsband, Stuttgart: Oldenbourg Wissenschaftsverlag, 2015, pp. 267-270. <https://www.semanticscholar.org/paper/Assisting-Mouse-PointerRecovery-in-Multi-Display-Fortmann-Nowak/faa3cc0c7f2bee6d2311cd409abcba15a8067128>.
Huculak, "How to master a multi-monitor setup on Windows 10," Windows Central, Apr. 28, 2020, 19 pages. <https://www.windowscentral.com/how-connect-and-set-multiple-monitors-windows-10>.

* cited by examiner

100

---

102  creating the virtual display area

↓

104  tracking a position of the mouse pointer within the virtual display area

↓

106  upon the mouse pointer being positioned within an area of any of the display areas, displaying the mouse pointer at its current position

↓

108  upon the mouse pointer being positioned outside the area of any of the display areas, but within the virtual display area, and displaying, instead of the mouse pointer, a vertical marker on another side border of another display

FIG. 1

UNRESTRICTED CURSOR POSITIONING IN MULTI-DISPLAY ENVIRONMENT

BACKGROUND

Field of the Disclosure

The disclosure relates generally to a method for controlling a mouse pointer, and more specifically, to a method for controlling a mouse pointer on a plurality of displays. The disclosure relates further to a display control system for controlling a mouse pointer on at least two displays, and a computer program product.

Related Art

Feature rich desktop applications are constantly driving the trend to use more than one display attached to desktop computers or also to docking stations of notebook computers. Most existing operating systems support such a mode of operation. By attaching multiple displays in an extended mode, it is possible to increase the presentation area. Most operating systems support combining displays with different resolutions and orientations. Also, the arrangement of the displays can be freely defined.

One problem in such multi-display environments may be the mouse pointer movement: if the mouse pointer is moved to a section of a border of one of the displays where no other display is directly adjacent, the mouse pointer is "caught" on that border, even if one continues to move the mouse further into this direction. Another problem is that the mouse pointer may become invisible because the mouse pointer visualizations used—e.g., an arrow—may move outside the visible area of the currently used display.

Furthermore, when cursors are moved from one visible display area to another, but the direct line from the cursor's current position to the target position crosses an area not covered by visible displays (leaves and re-enters the visible display areas), such direct cursor movement is not possible with current display controllers. Instead, the user must move the cursor along a detour trajectory, which remains within visible display areas at all times, to arrive at the target position. Thus, there may be a need to allow for a straight cursor movement from a start position in one visible display area to an end position in another visible display area, even if that straight line would not entirely lie within visible display areas.

In addition, with today's display drivers, when different visible display areas have no common boundary line (no common edge), but only touch at a corner, cursor movement from one display area to another may not be possible at all: the cursor may be confined within one of the display areas.

There are several publications related to a method for controlling a mouse pointer on at least two displays. The Document "Assisting Mouse Pointer Recovery in Multi-Display Environments" by Florian Fortmann et al, OFFIS (Institute for Information Technology of the University of Oldenburg) describes "[r]ecovering the mouse pointer in a multi-display environment after it got lost, e.g., because the user shifted his or her visual attention to another task . . . ."

Additionally, the document "Pointer Wrapping in Heterogeneous Multi-Monitor Environments" by Hrvoje Beno and Steven Feiner, Department of Computer Science, Columbia University, New York, N.Y., and published in the Proceedings of the Graphics Interface Conference 28-30 May 2007, Montreal, Canada describes " . . . a user study that compares the performance of four pointer-wrapping strategies, including a previously untested frame-memory placement strategy, in heterogeneous multi-Monitor environments, where displays vary in size, resolution and orientation."

However, none of the known documents address the above-described problem that a user may have no idea where a cursor position may be if it cannot be displayed. Thus, there may be a need to enhance a display manager in a way to keep visible track of a mouse pointer in a multi-display environment and a need for unrestricted cursor movement in a multi-display environment, including paths where the cursor position leaves and re-enters visible displays.

SUMMARY

According to one aspect of the present disclosure, a method for controlling a mouse pointer on at least two displays may be provided. The virtual display layout may define a mutual relative positioning of display areas relating to the at least two displays. The method may comprise creating the virtual display area comprising a rectangular overlay covering the complete area of the virtual display layout and tracking a position of the mouse pointer within the virtual display area.

The method may also comprise, upon the mouse pointer being positioned within an area of any of the display areas, displaying the mouse pointer at its current position on the respective display area. Upon the mouse pointer being positioned outside the area of any of the display areas, but within the virtual display area, the method includes displaying, instead of the mouse pointer, a first marker on a side border of the display in a direction the mouse pointer may be positioned within the virtual display area The method further includes displaying, instead of the mouse pointer, a second marker on at least one other side border of another display of the at least two displays in a direction the mouse pointer may be positioned within the virtual display area.

According to another aspect of the present disclosure, a display control system for controlling a mouse pointer on at least two displays may be provided. The virtual display layout may define a mutual relative positioning of display areas relating to the at least two displays. The display control system comprising a memory operatively coupled to a processor, wherein the processor, using program code stored in the memory, is configured to create the virtual display area comprising a rectangular overlay covering the complete area of the virtual display layout and track a position of the mouse pointer within the virtual display area.

The processor of the display control system, using program code stored in the memory, may also be configured to upon the mouse pointer being positioned within an area of any of the display areas, display the mouse pointer at its current position on the respective display area. Upon the mouse pointer being positioned outside the area of any of the display areas, but within the virtual display area, display, instead of the mouse pointer, a first marker on a side border of the display in a direction the mouse pointer is positioned within the virtual display area. In addition, the processor may be configured to display, instead of the mouse pointer, a second marker on at least one other side border of another display of the at least two displays in a direction the mouse pointer is positioned within the virtual display area.

The proposed method for controlling a mouse pointer on at least two displays may offer multiple advantages, technical effects, contributions and/or improvements:

The proposed technical solution enhances a user experience significantly in a multi-display or multi-monitor environment. Even in areas in which the cursor may normally not be visible in a virtual display area, the user may get an indication where the actual cursor position in the virtual display area may be. Visible indicators in a variable form—which may also be individually configurable—at borders of display areas referring in a one-to-one sense to physical displays may help estimating a cursor position using a simple coordinate system where a crossing point of virtual lines passes through markers at the borders or edges of the related displays.

This way, the cursor is no longer stuck or "caught" on an edge of one of the physical displays if the display areas within the virtual display area are separated by, or adjacent to, non-visible areas (gaps) that a straight movement of the cursor from one visible display area to another would have to cross.

The result may be a higher productivity of a user using the proposed concept and a more satisfying working environment. This may be achieved by the unrestricted mouse movement mode implemented as part of the here proposed concept.

In the following, additional embodiments of the inventive concept—applicable to the method as well as to the related system—will be described.

According to one embodiment of the method, the at least two displays may have each a rectangular shape. However, alternative shapes of the displays may be possible like elliptic, circular shapes or triangle shapes of the displays. Additionally, the shapes of the at least two displays do not have to be identical. They may have different shapes. Also, unusual display shapes, like a display in heart form or those which shape is embedded in a geometrical constrained environment may be possible.

According to an advantageous embodiment of the method, the first marker and the second marker may each be a marker oriented perpendicularly to a related side border of the respective display area. This way, the user using the displays may get an indication of the position of the cursor in the virtual display area even without seeing it on any of the physical displays.

According to one further advantageous embodiment of the method, the first marker and the second marker may each be a marker line perpendicularly oriented adjacent to a border line of the display areas. Thereby, the user gets an even better indication of the position of the cursor in the virtual display area by extrapolating visually the lines to a crossing point were the cursor is positioned in the virtual display area. Hence, and according to another embodiment of the method, virtual extension lines of the marker lines may define the crossing point indicative of the cursor position in the virtual display area.

According to an enhanced embodiment of the method, the marker lines may be displayed on display areas relating to opposite sides of a subarea of the virtual display area. This may be a useful feature if more than two displays are used of which at least two have parallel side borders. In this case, the virtual display area may have portions in between these two parallel side borders in which the cursor may be positioned. As a consequence, the marker lines of the respective two displays may both be positioned on the same virtual line crossing the virtual display area.

According to an even further enhanced embodiment of the method, the marker line of the side border of the opposite display, to which the mouse curser position is closer to, may be displayed indicating a higher closeness. This way, a user may get an indication to which side of the related two displays the cursor may be closer to. This may allow a better orientation for the user within the virtual display area.

According to another embodiment of the method, the marker line of the side border of the opposite display, to which the mouse curser position is further away, may not be displayed. This embodiment may also have different implementations. The marker line may not be displayed if the cursor is further away than a threshold value (e.g., percentage value of the distance between the two opposite displays). Furthermore, the marker line may be faded out the further the cursor in the virtual display area moves away from the side border of the related display. Additionally, a plurality of designs may be used for the marker, like arrows, color coded markers with which the color changes the closer the mouse pointer may be to a border of a display area. Additionally, the marker may also be a multiple arrow (i.e., an arrow with more than one peak). Also, the size of the marker may change with the closeness of the mouse pointer in the virtual display area to the border.

According to another advanced embodiment of the method, the higher closeness may be indicated by one selected out of the group comprising a bolder marker line, a number indicating a mouse pointer distance from the border, and a preselected color of the marker line. This way, the user of the displays may also get additional indications of the cursor and the virtual display area allowing a generally higher user experience.

According to an optional embodiment of the method, the at least two displays relating to the displays areas may be connected to a separate graphics adapter each. Alternatively, the at least two displays may also be connectable to another computer system, a display driver within the same or different computer systems. Additionally, the at least two displays may require different adapters. In some implementations, it may be required that an adapter-to-adapter protocol is implementable; e.g., in case of using two different computers or to different display adapters.

According to an allowable embodiment of the method, the display areas may overlap in the virtual display area. Hence, any positioning of the displays within the virtual display area—independent of the shape of the displays—may be allowable.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Embodiments of the disclosure will be described, by way of example only, and with reference to the following drawings:

FIG. 1 shows a block diagram of an embodiment of the method for controlling a mouse pointer on at least two displays.

Figure 2:
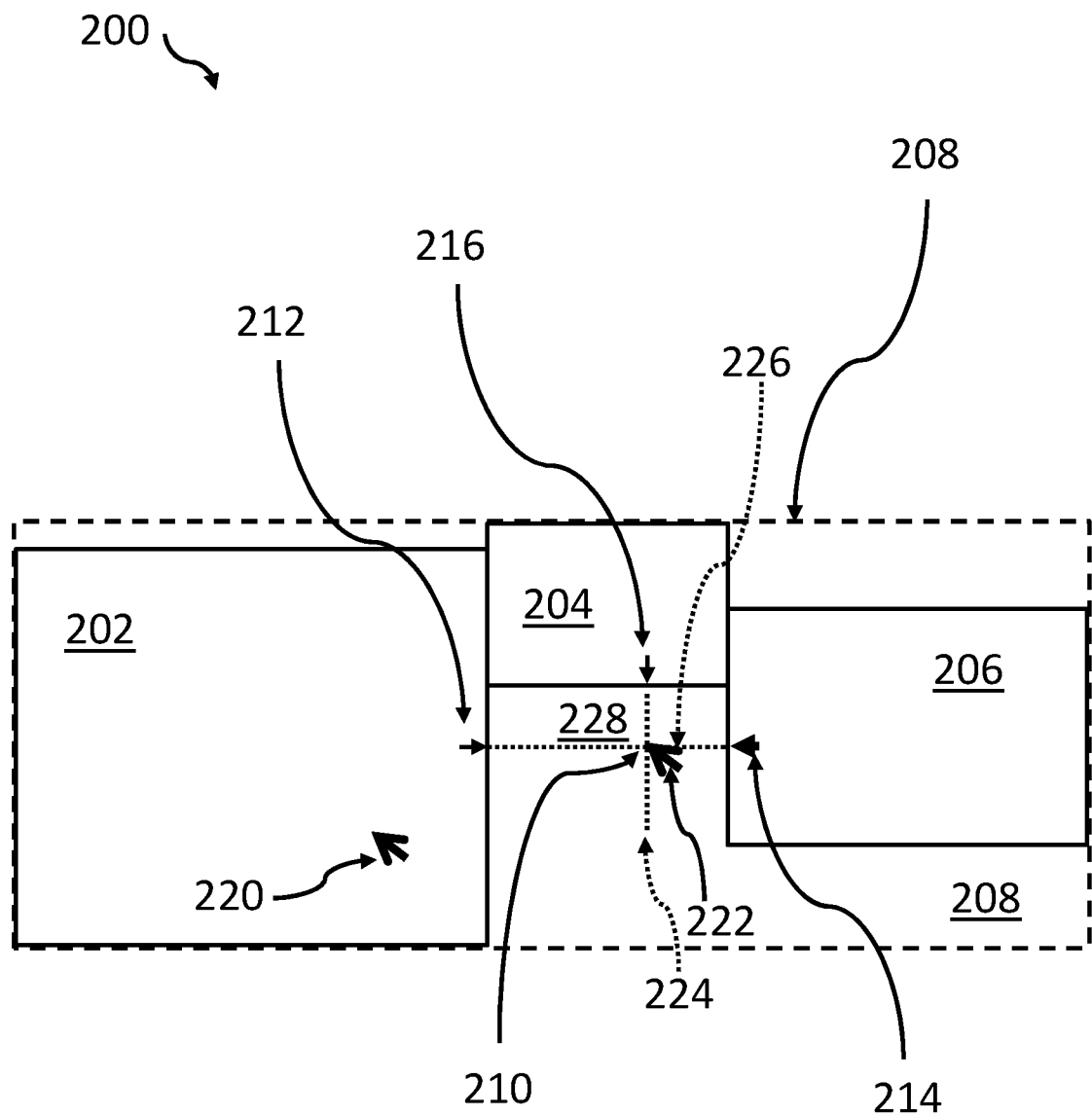

FIG. 2 shows a block diagram of an arrangement of 3 display areas.

FIG. 3 shows again a diagram of the virtual display area with 3 display areas.

Figure 4:
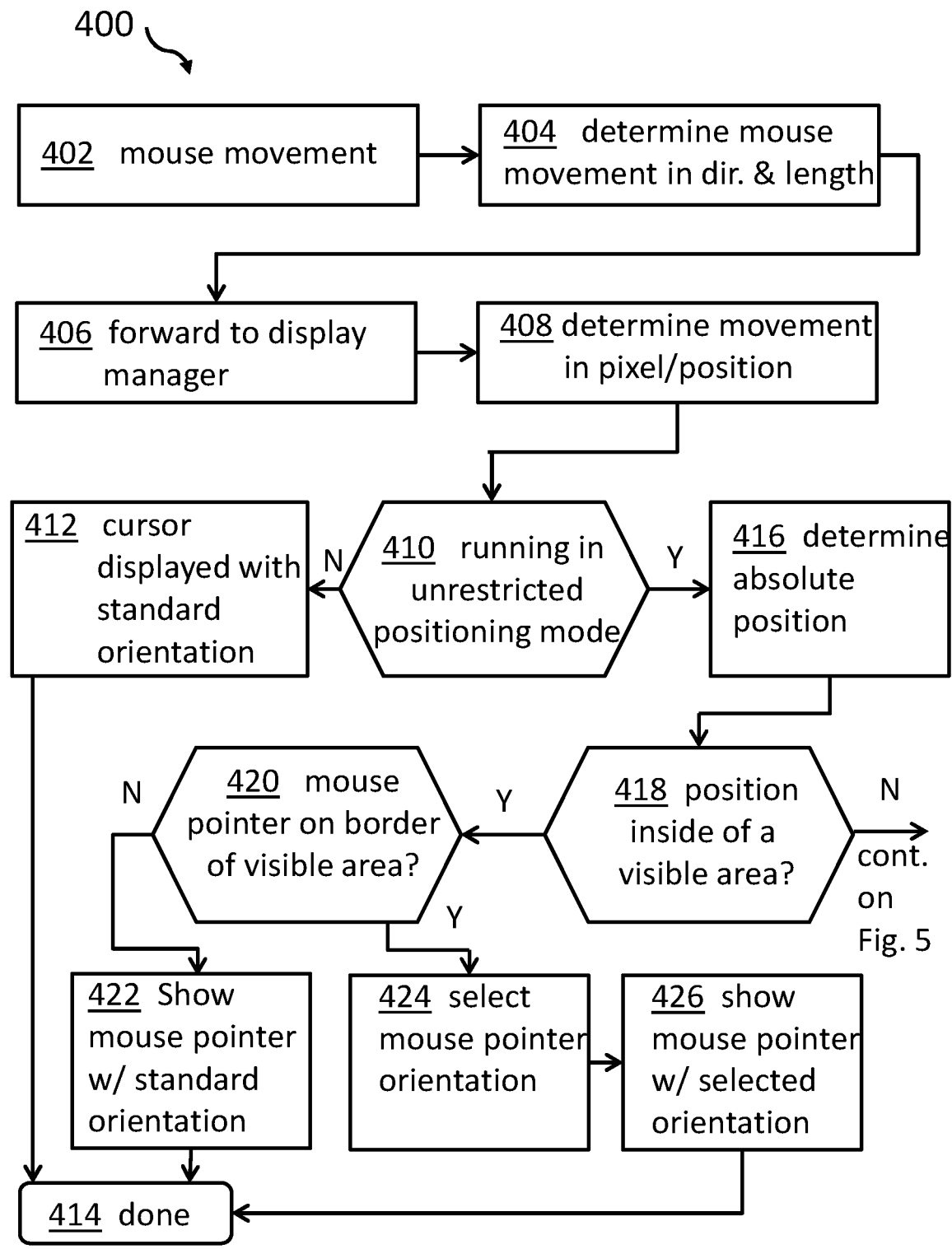

FIG. 4 shows a flowchart of an embodiment of a display manager logic.

Figure 5:
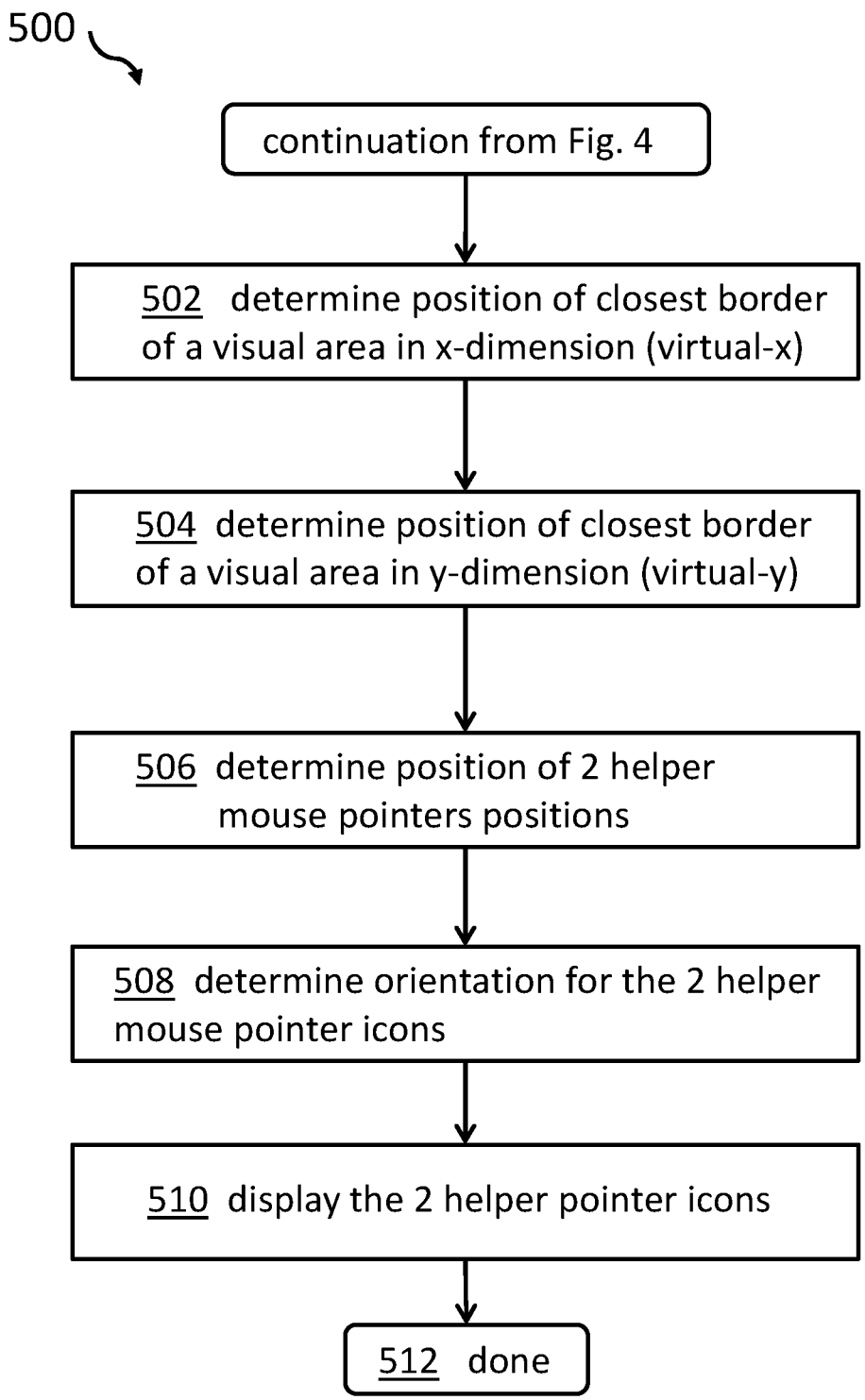

FIG. 5 shows a second portion of the flowchart of FIG. 4.

Figure 6:
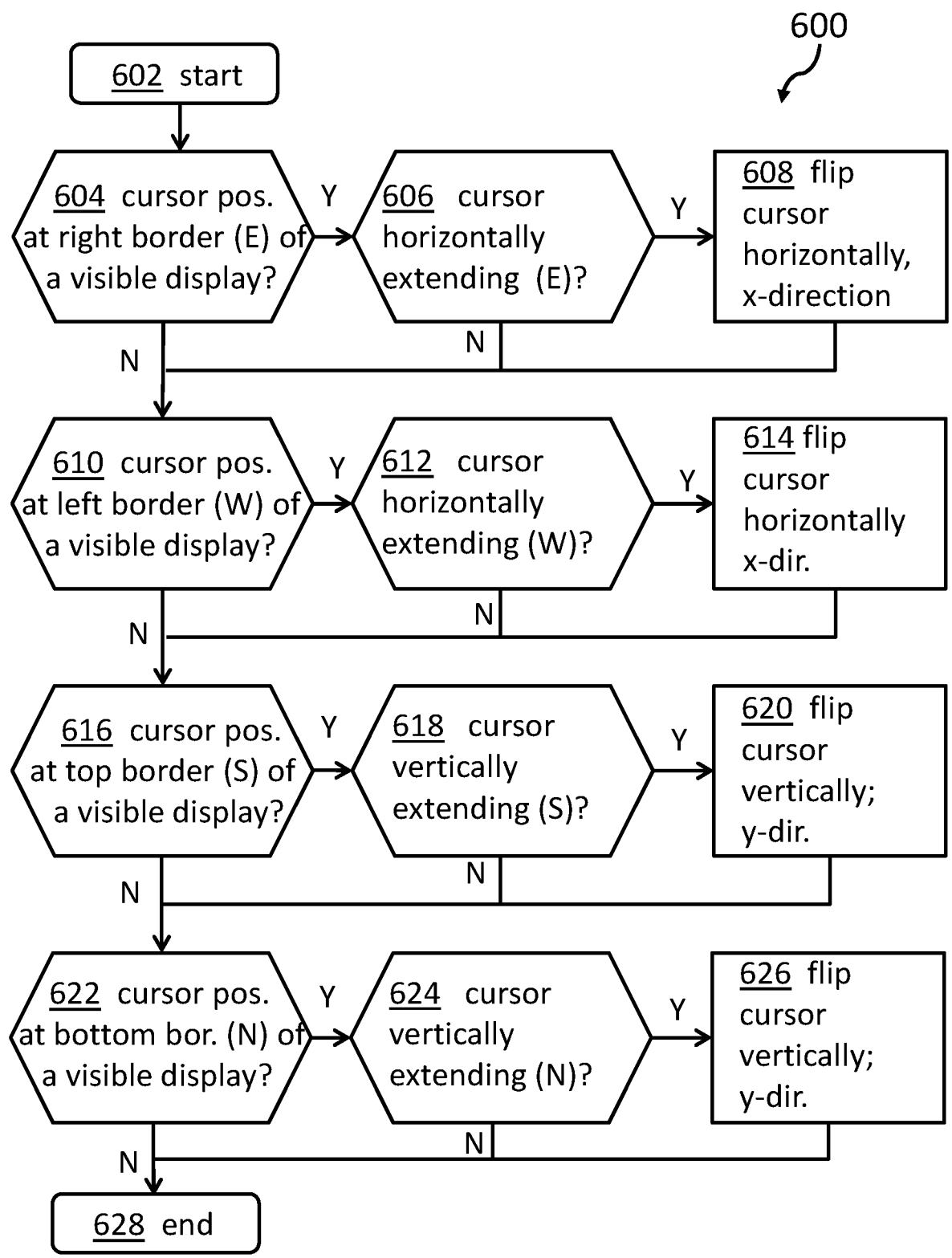

FIG. 6 shows a flowchart of an embodiment to determine the mouse pointer orientation.

Figure 7:
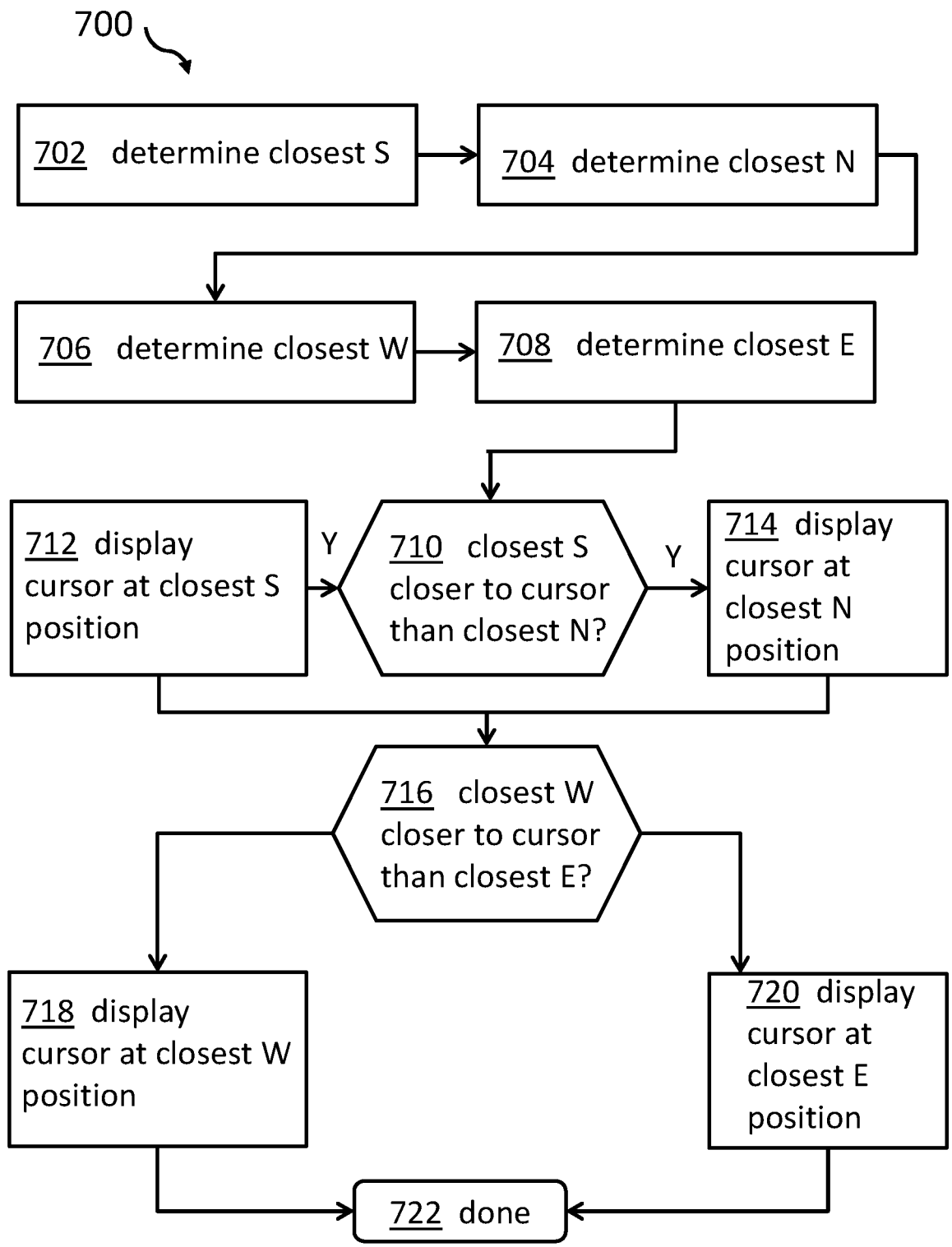

FIG. 7 shows a flowchart of an embodiment for a detailed algorithm to determine the position and orientation of the "helper" mouse markers.

Figure 8:
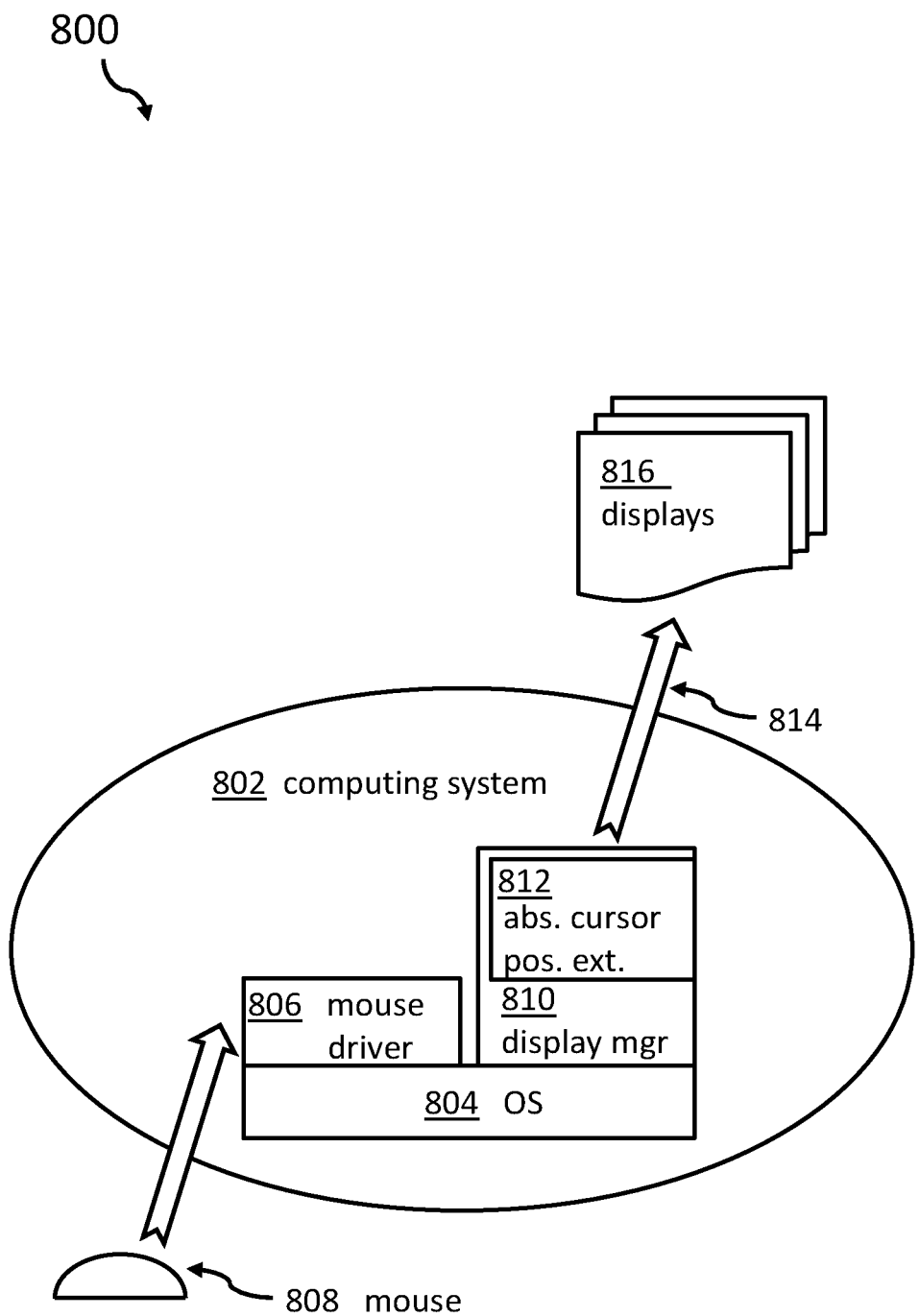

FIG. 8 shows a block diagram of how components of the proposed concept can be combined with already existing components to control multiple displays.

Figure 9:
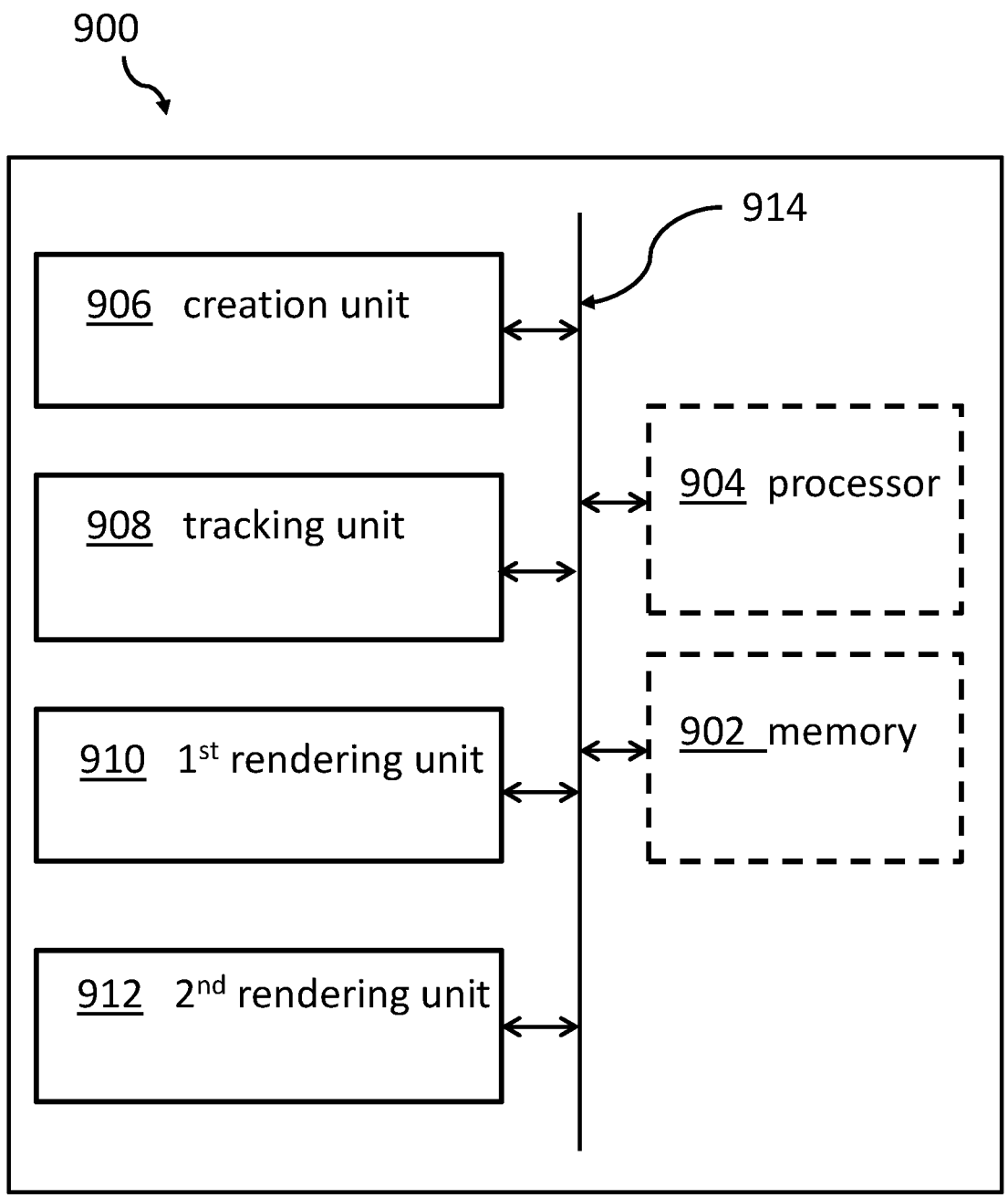

FIG. 9 shows a block diagram of components of the display control system.

Figure 10:
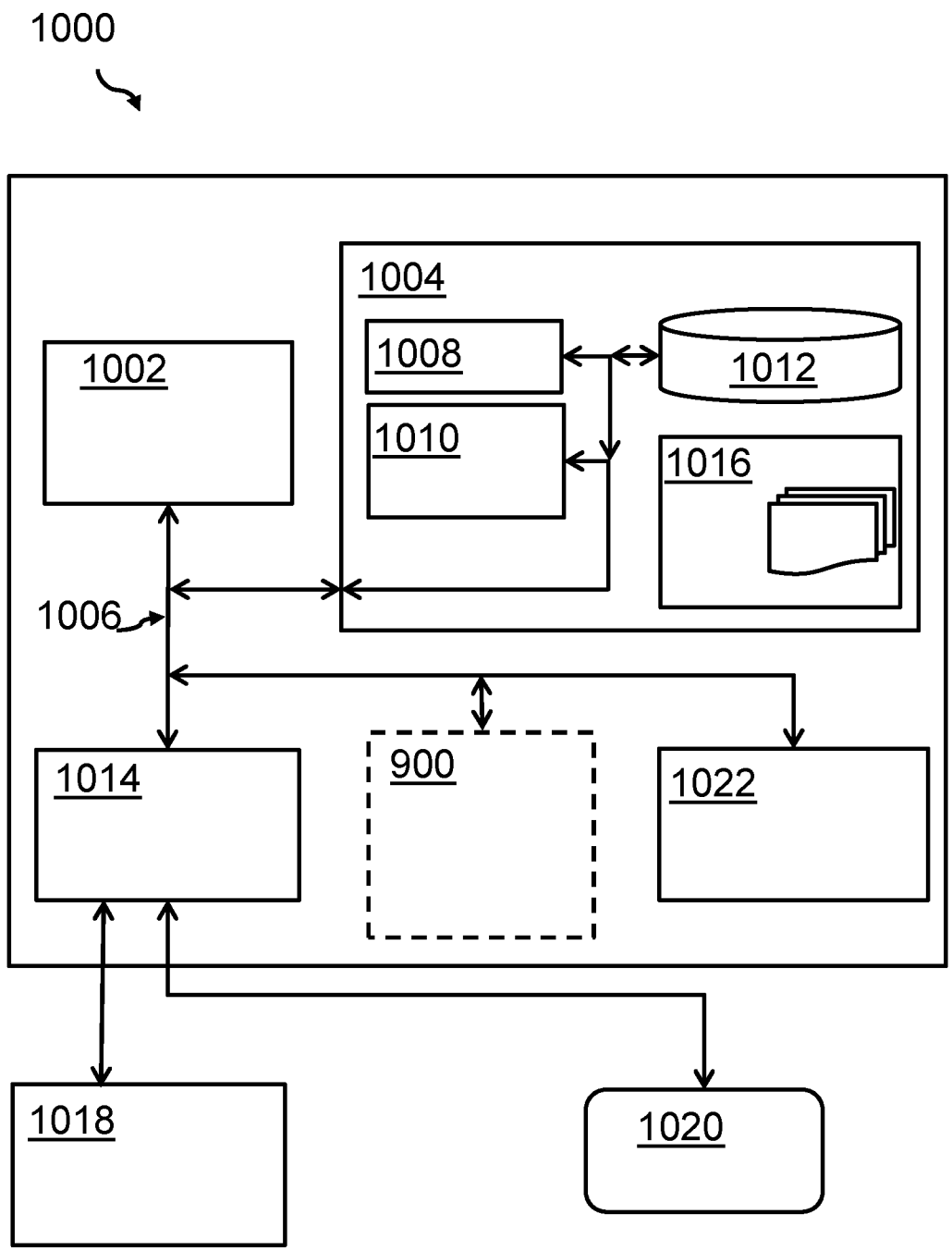

FIG. 10 shows an embodiment of a computing system comprising the display control system according to FIG. 9.

DETAILED DESCRIPTION

In the context of this description, the following conventions, terms and/or expressions may be used:

The term 'mouse pointer' may denote here an indicator of a position of a cursor. The cursor may be controlled by a mouse or similar device like a tracking point or, on a touch screen, with a fingertip or a simulating device. The terms mouse pointer—or in short, pointer—and cursor may be used interchangeably.

The term 'display' may denote a physical, visible display connected to a computing system. To each display, a display area may be related. The display area may correspond in a 1:1 way to the physical display or screen. The display area may be used as a rendering platform inside the computer system—i.e., in memory—for objects to be displayed using the physical display.

The term 'virtual display layout' may denote the way the display areas may be positioned to each other, in particular, and the virtual display area.

The term 'virtual display area' may denote a rectangle encircling or embracing the display areas. The virtual display area may represent the smallest rectangular area in which the virtual areas are positioned.

The term 'marker' may denote an indicator or "helper" mouse pointer positioned on the right or left border of a display area, and thus, on a physical display. It may be displayed as a horizontal marker or horizontal line but other visual indicators are also possible. Additionally, a second marker or indicator or "helper" mouse pointer may be positioned on the top or bottom border of a display area, and thus on the related physical display. The marker and the second marker may be interpreted as virtual coordinates of the mouse pointer in the virtual display area.

The term 'side border' may denote any of the four sides of a rectangular physical display, and thus, of the related display area.

The term 'marker line' may denote an indicator on a side or a border of a display area. It may also be denoted as a "helper" mouse pointer. The marker may take a wide variety of visible forms.

The term 'border line' may denote an outer limit of a display area or physical display or virtual display area.

The term 'unrestricted mouse movement mode' may denote the here newly described mode of a display manager or, at least in parts, the display control system. The display control system may be implemented as part of a traditional display manager and may enhance its functions. Thus, the terms 'display manager' and 'display control system' may be used interchangeably.

In the following, a detailed description of the figures will be given. All instructions in the figures are schematic. Firstly, a block diagram of an embodiment of the method for controlling a mouse pointer on at least two displays is given. Afterwards, further embodiments, as well as embodiments of the display control system for controlling a mouse pointer on at least two displays, will be described.

FIG. 1 shows a block diagram of an embodiment of the method 100 for controlling a mouse pointer—or cursor, which may also be moved on screen/display using a track ball or another device—on at least two displays. However, the method 100 or related system can also be implemented with more than 2 displays. Thereby, a virtual display layout is defining a mutual relative positioning of display areas relating to the at least two displays. The method 100 comprises creating, 102, the virtual display area comprising a rectangular overlay covering the complete area of the virtual display layout.

The virtual display area is typically the smallest encircling rectangle which has a common outer line with the display being positioned the farthest away from a center of the virtual display area. However, this is not a strict requirement, but rather a practical limitation. Furthermore, it can be assumed that the display areas are touching each other and that no complete empty space (in x and y direction) is between each respective two displays.

The method 100 further comprises tracking, 104, a position of the mouse pointer within the virtual display area, and upon the mouse pointer being positioned within an area of any of the display areas. The method 100 also comprises displaying, 106, the mouse pointer at its current position on the respective display area in the traditional manner. However, upon the mouse pointer being positioned outside the area of any of the display areas, but within the virtual display area, the method comprises displaying, 108, instead of the mouse pointer, a first marker of any kind on a side border of the display in a direction the mouse pointer is positioned within the virtual display area, and displaying instead of the mouse pointer, a second marker of any kind on at least one other side border—i.e., +−90° turned—of the other display of the at least two displays in a direction the mouse pointer is positioned within the virtual display area.

FIG. 2 shows a block diagram of an arrangement 200 of 3 display areas 202, 204, 206. The display areas 202, 204, 206 are surrounded or encircled by the smallest rectangle building an outside border of the virtual display area 208. It may be understood that the positioning of the display areas 202, 204, 206 represent physical screens or displays (not shown) which may, in the physical world, be positioned completely different to the positioning in the virtual display area 208. The number of display areas in the virtual display area 208 can be one (e.g., 202), two (202 and 204) or any other larger number. The user may—on a graphical user interface—move the virtual display areas 202, 204, 206 around so that they may overlap or are positioned adjacent to each other, at least at one border side.

Traditional display managers use a snap-to-frame logic to define the mouse pointer position if the pointer would leave the visible display area. The mouse pointer in the direction of the movement is frozen, and the pointer "gets stuck" at the border of the visible area of a display, even if other displays could be reached by moving further into the direction. Only movements in another direction remain possible; moving a mouse pointer through an invisible area from one display to another is not supported in existing display managers.

Traditionally, it will not be possible to move straight from display area 202 to display area 206 through the invisible area below display area 204. Instead, the visible area of display area 204 must be used as a "tunnel" or "detour" to move from display area 202 to display area 206. As a side effect of this snap-to-frame logic, the user may get an "invisible" mouse pointer.

In contrast to this, the enhanced display manager—supported by the here-proposed method or system—offers an "unrestricted mouse movement mode" in a multi-display environment, as shown in FIG. 2. The user may—through a user dialogue in a graphical user interface using the enhanced display manager—explicitly activate the unrestricted mouse movement mode.

Once the user has selected that mode, (a) the virtual display area will determine the smallest enclosing rectangle of all visible screens/display areas 202, 204, 206 in the multi-display environment. (b) An unrestricted cursor movement inside the virtual display area is allowed. (c) The mouse pointer would be shown by the configured icon and as long as the virtual mouse pointer location is inside a display area. When the pointer position is outside of all displays/display areas, the pointer icon is split into at least two which are displayed at the closest points of the actual pointer position, at the borders of the display areas. The orientation of these markers will be chosen such that they are always visible.

The display manager is a module of an operating system that controls what is shown on the display(s). The computer desktop extending across multiple displays is called a multi-display environment. With an increasing number of productivity applications, working with multiple displays has become very popular. The display manager must arrange the displays in the multi-display environment, the content to show in each display, and the handling of mouse movements.

In order to enter such extended display mode, it is necessary to detect available displays and to define the different displays and their relationship to each other by the operating system. The display selection is performed by the operating system each time the operating system boots and detects the attached hardware or new displays are connected to the computer system, or the computer system (e.g., a notebook computer) is plugged into a docking station. The operating system may also perform the required detection at other instances not specified here. The displays may also be touch screens.

It may also be noted that in existing display managers a number (integer) is assigned to each display which then allows the user to define their position relative to each other. It may also be noted that the existing display managers only allow attaching displays along their borders which must be adjacent but not overlapping. Traditional display managers do not allow that visible portions of displays or display areas cannot become disconnected.

Typically, a 0/0 position will be defined by the left border of the leftmost display in the virtual display area 208, and the upper border of the upmost display in the arrangement (top left corner). Similarly, the maximum x-coordinate will be defined by the right part of the rightmost display, and the maximum y-coordinate will be the lower border of the lowest display (bottom right corner).

It may also be noted that the different displays may have different resolutions. Consequently, also the display areas 202, 204, 206 may require calculating or determining the cursor position using the different display resolutions.

A first marker, i.e., a semi-transparent upper marker 216 is positioned in the display area 204, a second marker, i.e., a semi-transparent left side marker 212 is positioned in the display area 202, and a third marker, i.e., a semi-transparent right side marker 214 is positioned in the display area 206. As discussed further, "positioned" on a display does not necessarily mean "visible" on the display. The three semi-transparent markers 212, 214, 216 each include a virtual extension line. As shown, the virtual extension lines 224 and 226 of markers 214 and 216, respectively, intersect to define a crossing point 210 indicating a virtual position of the mouse pointer within a subarea 228 of the virtual display area 208. The virtual extension lines 224 and 226 are not visible, but shown for purposes of clarity. Furthermore, it may be noted that the semi-transparent right side marker 214 is shown bolder than the semi-transparent left side marker 212 on the opposite side of the subarea 228. The difference in the weighting of the markers 214 and 212 indicates the position of the mouse pointer at the crossing point 210 in the subarea 228 of the virtual display area 208, where the mouse pointer in the virtual display area 208 is closer to, i.e., has a greater proximity to the right side of the subarea 228 and the marker 214 than the left side of the subarea 228 and the marker 212. In some embodiments, one or more numerical values indicating mouse pointer distances from respective borders are used indicate the mouse pointer position within the virtual display area 208. In some embodiments, the marker lines may be assigned preselected colors to indicate the proximities of the mouse pointer position to the respective borders. In some embodiments, for example, the marker 212 that is less proximate with respect to the crossing point 210, i.e., further from the crossing point 210 than the marker 214, is not displayed on the respective display area 202. In some embodiments, the semi-transparent markers 212, 214 216 serve as semi-transparent "helper" mouse pointer icons, with marker lines (discussed further with respect to FIG. 6) and the terms are used interchangeably herein. Each marker line of a respective mouse pointer icon is coincident with the respective virtual extension line. Also shown in FIG. 2 are two mouse pointer icons that are shown exclusively for illustrative purposes only. One mouse pointer icon 220 is shown visible on the display area 202 to illustrate how the mouse pointer 220 would appear in any of the display areas 202, 204, 206. The mouse pointer icon 220 cannot be seen in the virtual display area 208. Also shown is a mouse tracking position 222 visible on the virtual display area 208 in the subarea 228 to show the virtual position of where the mouse pointer icon 220 would be in reference to the crossing point 210. Therefore, the mouse tracking position is a virtual two-coordinate construct resident within a memory device (not shown in FIG. 2) with reference to the semi-transparent markers 212, 214 216 to facilitate visual representation to a user. Accordingly, the mouse tracking position 222 is not visible to the user.

Figure 3:
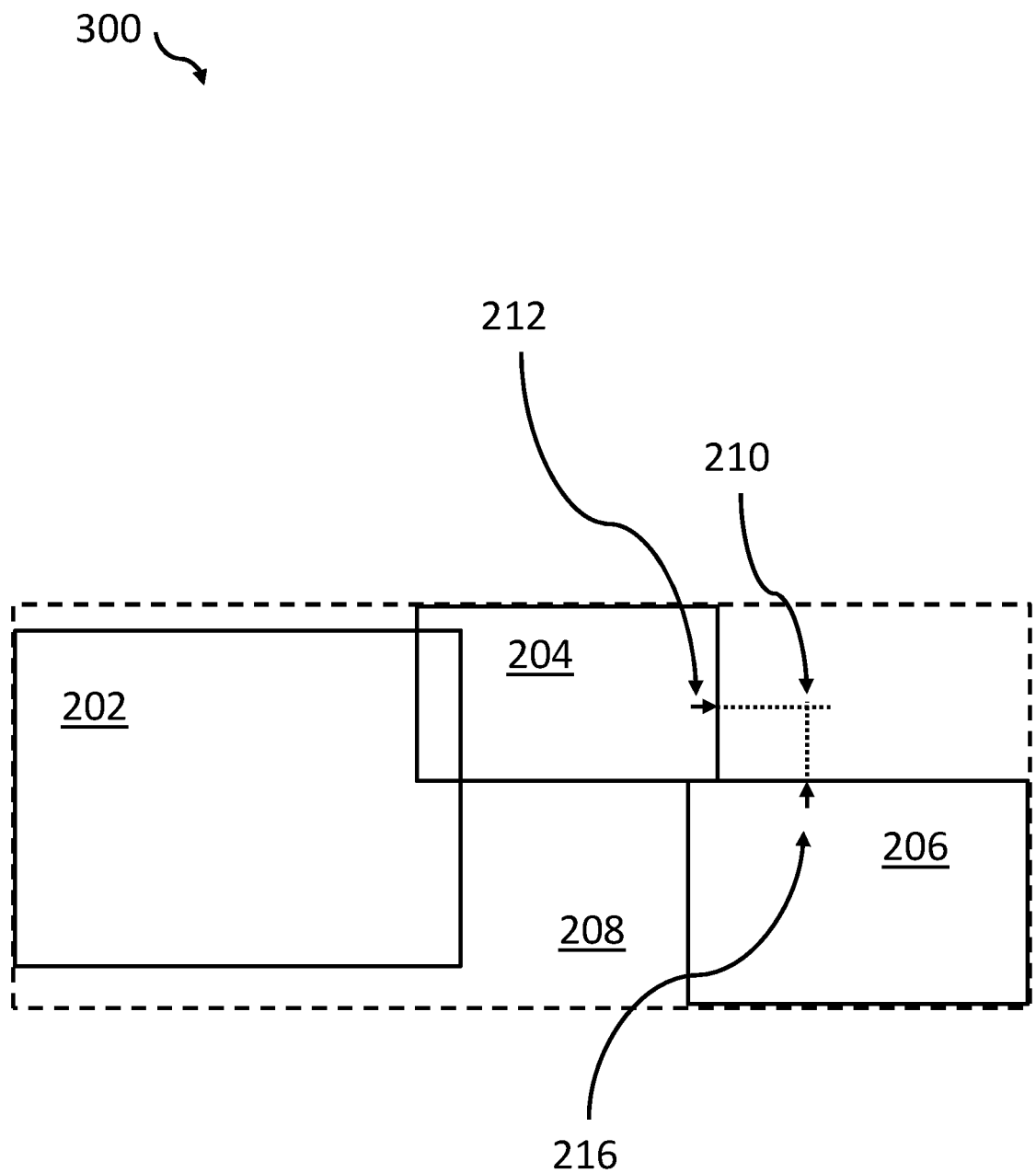

FIG. 3 shows a diagram 300 of the virtual display area 208 with the 3 display areas 202, 204, 206. Here, display area 202 overlaps display area 204. Also, each of the 3 display areas 202, 204, 206 define at least one side of the four sides of the virtual display area 208. It may be noted that the dashed line indicating the virtual display area 208 is shown a little bit outside the border of the respective display areas 202, 204, 206. However, this is only for visual clarity and comprehensibility reasons, where normally, the side borders of the display areas 202, 204, 206 would be in line with the outer borders of the virtual display area 208. Additionally, FIG. 3 shows the markers 212, 216 defining the crossing point 210 indicating the position of the mouse pointer in the virtual display area 208.

FIG. 4 shows a flowchart 400 of an embodiment of a display manager logic or display manager for mouse movements in the unrestricted mouse movement mode. A mouse movement 402 is detected by the mouse driver of the operating system. The mouse driver (not shown) determines, 404, the mouse movement in direction and length. This confirmation is passed, 406, to the display manager via operating system functions.

All further activities will be controlled by the here proposed method, the display manager or the proposed display control system. In a next step, the movement of the cursor (or mouse pointer) is determined, 408, in a number of pixels to arrive at the new position.

Next, 410, it will be determined, whether the display manager is running in the unrestricted mouse movement mode. If that is not the case—case "N"—the cursor position is determined and displayed in the standard orientation with the respective restricted positioning according to traditional methods, 412, and the process ends, 414.

If instead the display manager is running in the unrestricted mouse movement mode—case "Y"—an absolute position in the virtual display area is determined, 416. Next, it is determined, 418, whether the absolute position lies inside a visible area of one of the display areas. If that is not the case—case "N"—the process description continues on FIG. 5.

In case of a positive outcome of the determination relating to the reference numeral 418—case "Y"—it is determined 420, whether the mouse pointer is at a border of a display. If that is not the case—case "N"—the mouse pointer is shown, 422, with a standard orientation according to traditional conventions. Then the process ends, 414.

If the determination 420 has a positive outcome—case "Y"—a mouse pointer icon orientation is selected, 424, using the algorithm according to FIG. 6. Then the mouse pointer is shown with the selected orientation, 426. Finally, also this branch of the flowchart ends at 414.

FIG. 5 shows a second portion 500 of the flowchart 400 of FIG. 4. If it is determined, 418 (see FIG. 4) that the mouse pointer position is not lying inside of a visible display area, e.g., display areas 202, 404, 206, a determination 502 regarding the position of the closest border of a visual area in the x-dimension (virtual-x) is performed. Next, a determination 504 regarding the position of the closest border of a visual area in the y-dimension (virtual-y) is performed.

In a next step, the position of the 2 helper mouse pointers or marker positions is determined, 506. Furthermore, the related orientation of the two helper mouse pointer icons or markers is determined, 508. Finally, 510, the two helper mouse pointer icons or markers are displayed. At 512, this particular process ends.

FIG. 6 shows a flowchart 600 of an embodiment to determine the mouse pointer orientation. As a convention used to describe this figure, the following conventions may be used:
 up (decreasing y-coordinate)=S (South);
 down (increasing y-coordinate)=N (North);
 right (increasing x-coordinate)=E (East);
 left (decreasing x-coordinate)=W (West).

To illustrate the directional conventions, the virtual extension lines 224 and 226 of markers 212/214 and 216, respectively, that intersect to define the crossing point 210, thereby indicating the mouse tracking position 222 within the virtual display area 208, extend in respective directions. As discussed above, the virtual extension lines 224 and 226 are not visible. For example, the virtual extension line 226 extends to the right (East) and left (West) through the crossing point 210. Furthermore, the virtual extension line 224 extends downward (North) and upward (South) through the crossing point 210.

These extensions of the mouse pointer can be determined once the mouse pointer is chosen, or be part of the mouse pointers icon metadata.

The process starts at 602. Firstly, it is determined, 604, whether the cursor position (equivalent to be used with mouse pointer) at the right border (E) of a visible display (i.e., one of display areas 202, 204, 206). If that is the case ("Y"), it is determined, 606, whether the cursor icon is horizontally extending (E) only. If that is the case ("Y"), the cursor icon is flipped, 608, horizontally in the x-direction.

In case of negative outcomes of the determinations 604 and 606 and after the execution of flipping the cursor, 608, the process flow continues with the determination 610, whether the cursor position is at a left border of (W) of a visual display (i.e., one of display areas 202, 204, 206). If that is the case ("Y"), it is determined, 612, whether the cursor icon is horizontally extending (W) only. If that is the case ("Y"), the cursor icon is flipped, 614, horizontally in the x-direction.

In case of negative outcomes of the determinations 610 and 612 and after the execution of flipping the cursor, 614, the process flow continues with the determination 616, whether the cursor position is at a top border of (S) of a visual display (i.e., one of display areas 202, 204, 206). Then (if "YES"), it is determined, 618, whether the cursor icon is vertically extending (S) only. If that is the case ("Y"), the cursor icon is flipped, 620, vertically in the y-direction.

In case of negative outcomes of the determinations 616 and 618 and after the execution of flipping the cursor, 620, the process flow continues with the determination 622 whether the cursor position is at a bottom border of (N) of a visual display (i.e., a display area 202, 204, 206). Then (if "YES"), it is determined, 624, whether the cursor icon is vertically extending (N) only. If that is the case ("Y"), the cursor icon is flipped, 626, vertically in y-direction. Then the process ends at 628.

FIG. 7 shows a flowchart 700 of an embodiment for a detailed algorithm to determine the position and orientation of the "helper" mouse markers when the mouse pointer is not in any of the visibly display areas 202, 204, 206.

As a starting remark, it should be clear that the horizontal and vertical lines extending through and defining the cursor position (compare FIG. 2) as further discussed with respect to FIG. 7, when being outside all visible displays, must both intersect at least one visible display area because (i) the virtual display area is the smallest enclosing rectangle of the grouping of visible displays and (ii) the visual display arrangement is always coherent, i.e., the visual display arrangement is not allowed to include visual displays that exceed established display distancing parameters.

The "icon orientation algorithm" can be described in the following way: Firstly, extend a vertical line through the cursor position and intersect the vertical line with first horizontal lines extending through the bottom borders of all of the displays. Based on this, determine the closest intersection point of the vertical line and the first horizontal lines to the cursor position and denote that point by "closest_S", 702.

Then, intersect the vertical line extending through the cursor position with second horizontal lines extending through the top borders of all visible displays, i.e., display areas, respectively. Based on this, determine the closest intersection point of the vertical line and the second horizontal lines to the cursor position and denote that point by "closest_N", 704.

Then, extend a horizontal line through the cursor position and intersect the horizontal line with first vertical lines extending through the right borders of all of the displays. Based on this, determine the closest intersection point of the horizontal line and the first vertical lines to the cursor position and denote that point by "closest_W", 706.

Finally, intersect the horizontal line extending through the cursor position with second vertical lines extending through the left borders of all of the displays. Based on this, determine the closest intersection point of the horizontal line and the second vertical lines to the cursor position and denote that point by "closest_E", 708.

Next, 710, it is determined whether the "closest_S" is closer to the cursor position than the "closest_N". If that is the case—case "Y"—the cursor is shown, 712, at the closest_S position and the icon orientation algorithms of FIG. 6 are applied. In the case of the determination operation 710 being "N", the cursor is shown, 714, at the closest_N position and the icon orientation algorithms of FIG. 6 are applied.

Next, 716, it is determined whether the "closest_W" is closer to the cursor position than the "closest_E". If that is the case—case "Y"—the cursor is shown, 718, at the closest_W position and the icon orientation algorithms of FIG. 6 are applied. In the case of the determination operation 760 being "N", the cursor is shown, 720, at the closest_E position and the icon orientation algorithms of FIG. 6 are applied. Then, the process ends at 722.

FIG. 8 shows a block diagram 800 of how components of the proposed concept can be combined with already existing components to control multiple displays. Within a computing system 802 an operating system (OS) 804 is launched and executes its respective tasks. The mouse driver 806 receives input from physical movements of the computer mouse 808 or other pointer movement device. The display manager 810 is acting in cooperation with the operating system 804. However, the display manager 810 is enhanced with the absolute cursor positioning extension 812—also denotable as the extended display manager or display control system—which operates according to the here-proposed concept. It is enabled in such a way that the display manager 810 shows, 814, the cursor position (i.e., mouse pointer position) in the above-described manner on a plurality of displays 816.

FIG. 9 shows a block diagram of components of the display control system 900—also denoted both as display manager with the absolute cursor positioning extension (see FIG. 8)—for controlling a mouse pointer on at least two displays. Thereby a virtual display layout is defining a mutual relative positioning of display areas relating to the at least two displays. The display control system 900 comprises a memory 902 operatively coupled to a processor 904, where the processor 904, using program code stored in the memory 902, is configured to create—in particular with a creation unit 906, the virtual display area comprising a rectangular overlay covering the complete area of the virtual display layout and track—in particular with a tracking unit 908—a position of the mouse pointer within the virtual display area.

The processor 904 of the display control system 900, using program code stored in the memory 902, is also adapted to display—in particular by the first rendering unit 910—the mouse pointer at its current position on the respective display area if it is determined that the mouse pointer is being positioned within an area of any of the display areas.

Furthermore, the processor 904 of the display control system 900, using program code stored in the memory 902, is also adapted to display, instead of the mouse pointer, a first marker on a side border of the display in a direction the mouse pointer is positioned within the virtual display area, and to display, instead of the mouse pointer, a second marker on at least one side border of another display of the at least two displays in a direction the mouse pointer is positioned within the virtual display area if the mouse pointer is positioned outside the area of any of the display areas, but within the virtual display area. The last two displaying steps may be performed with a $2^{nd}$ rendering unit 912.

It may also be noted that in particular, the memory 902, the processor 904, the creation unit 906, the tracking unit 908, the $1^{st}$ rendering unit 910 and the $2^{nd}$ rendering unit 912, which may at least in part have identical components with the $1^{st}$ rendering unit 910, can be enabled to exchange data and electrical systems. For this, the components and units can be connected through an internal bus system 914.

Embodiments of the disclosure may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the disclosure described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the disclosure.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the disclosure, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the display control system 900 for controlling a mouse pointer on at least two displays can be attached to the bus system 1006.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

At least a portion of the inventive concepts disclosed herein can be summarized by the following clauses:

What is claimed is:

1. A method of controlling a mouse pointer on at least two displays, wherein a virtual display layout is defining a mutual relative positioning of display areas relating to said at least two displays, said method comprising:
creating a virtual display area comprising a rectangular overlay covering a complete area of said virtual display layout;
tracking a position of said mouse pointer within said virtual display area;
upon said mouse pointer being positioned within an area of any of said display areas, displaying said mouse pointer at its current position on said respective display area; and
upon said mouse pointer being positioned outside said area of any of said display areas, but within said virtual display area:
determining an absolute position of said mouse pointer in said virtual display area while said mouse pointer is outside said area of any of said display areas;
when said mouse pointer is outside said area of any of said display areas, displaying, instead of said mouse pointer, a first marker on a side border of a display of said at least two displays in a direction said mouse pointer is positioned within said virtual display area extending along a first dimension of the absolute position; and
when said mouse pointer is outside said area of any of said display areas, displaying, instead of said mouse pointer, a second marker on at least one other side border of another display of said at least two displays in a direction said mouse pointer is positioned within said virtual display area extending along a second dimension of the absolute position.

2. The method according to claim 1, wherein each display of said at least two displays has a rectangular shape.

3. The method according to claim 1, wherein said first marker and said second marker are each a marker oriented perpendicularly to a related side border of said respective display area.

4. The method according to claim 1, wherein said first marker and said second marker are each a marker line perpendicularly oriented adjacent to a respective border of said display areas, and said first marker is perpendicularly oriented to said second marker.

5. The method according to claim 4, wherein virtual extension lines of each marker line define a crossing point indicative of said mouse pointer in said virtual display area.

6. The method according to claim 1, wherein a plurality of marker lines are positioned on respective display areas relating to opposite sides of a subarea of said virtual display area.

7. The method according to claim 6, wherein one of the plurality of marker lines is a marker line of a side border of an opposite display of one of the opposite sides of the subarea, to which said mouse pointer is closer to, is displayed indicating a greater proximity.

8. The method according to claim 7, wherein said marker line of said side border of said opposite display, to which said mouse pointer is further away, is not displayed.

9. The method according to claim 7, wherein said greater proximity is indicated by one or more of a bolder marker line, a number indicating a mouse pointer distance from said side border, and a preselected color of said marker line,
wherein a difference in a weighting of the bolder marker line from said marker line indicates the proximity of said mouse pointer to said side border of said opposite display and said side border of said display, and the preselected color indicating the proximity of said mouse pointer to said side border of said opposite display.

10. The method according to claim 1, wherein said at least two displays relating to said display areas are connected to a separate graphics adapter.

11. The method according to claim 1, wherein said display areas overlap in said virtual display area.

12. A display control system of controlling a mouse pointer on at least two displays, wherein a virtual display layout is defining a mutual relative positioning of display areas relating to said at least two displays, said display control system comprising:
a processor;
a memory operatively coupled to said processor, wherein said processor, using program code stored in said memory, is configured to:
create a virtual display area comprising a rectangular overlay covering a complete area of said virtual display layout;
track a position of said mouse pointer within said virtual display area;
upon said mouse pointer being positioned within an area of any of said display areas, display said mouse pointer at its current position on said respective display area, and
upon said mouse pointer being positioned outside said area of any of said display areas, but within said virtual display area:
determining a movement of said mouse pointer in the virtual display area in a direction and length as a distance from respective borders within said virtual display area while said mouse pointer is outside said area of any of said display areas;
when said mouse pointer is outside said area of any of said display areas, display, instead of said mouse pointer, a first marker on a side border of a display of said at least two displays in a direction said mouse pointer is positioned within said virtual display area extending along a first dimension of the current position; and
when said mouse pointer is outside said area of any of said display areas, display, instead of said mouse pointer, a second marker on at least one side border of another display of said at least two displays in a direction said mouse pointer is positioned within said virtual display area extending along a second dimension of the current position,
wherein the first marker and the second marker are visible while the current position of said mouse pointer is outside said display areas, but within said virtual display area.

13. The display control system according to claim 12, wherein each display of said at least two displays have a rectangular shape.

14. The display control system according to claim 12, wherein said first marker and said second marker are each a marker oriented perpendicularly to a related side border of said respective display area.

15. The display control system according to claim 12, wherein said first marker and said second marker are each a marker line perpendicularly oriented adjacent to a respective border of said display area, and said first marker is perpendicularly oriented to said second marker.

16. The display control system according to claim 15, wherein virtual extension lines of each marker line define a crossing point indicative of said mouse pointer in said virtual display area.

17. The display control system according to claim 12, wherein a plurality of marker lines are positioned on respective display areas relating to opposite sides of a subarea of said virtual display area.

18. The method according to claim 17, wherein one of the plurality of marker lines is a marker line of a side border of an opposite display of one of the opposite sides of the subarea, to which said mouse pointer is closer to, is displayed indicating a greater proximity,
  wherein said greater proximity is indicated by a difference in a weighting of a bolder marker line from said marker line that indicates the proximity of said mouse pointer to said side border of said opposite display and said side border of said display.

19. The method according to claim 1, wherein said at least two displays relating to said display areas are connected to a separate graphics adapter.

20. A computer program product of controlling a mouse pointer on at least two displays, wherein a virtual display layout is defining a mutual relative positioning of display areas relating to said at least two displays, said computer program product comprising a computer readable storage medium having program instructions embodied therewith, said program instructions being executable by one or more computing systems or controllers to cause said one or more computing systems to:

create, by said one or more computing systems or controllers, a virtual display area comprising a rectangular overlay covering a complete area of said virtual display layout;
  track, by one or more computing systems or controllers, a position of said mouse pointer within said virtual display area;
  upon said mouse pointer being positioned within an area of any of said display areas, display, by one or more computing systems or controllers, said mouse pointer at its current position on said respective display area; and
  upon said mouse pointer being positioned outside said area of any of said display areas, but within said virtual display area:
    determining a movement of said mouse pointer in the virtual display area in a direction and length while said mouse pointer is outside said area of any of said display areas;
    when said mouse pointer is outside said area of any of said display areas, display, by one or more computing systems or controllers, instead of the mouse pointer, a first marker on a side border of a display of said at least two displays in a direction said mouse pointer is positioned within said virtual display area extending along a first dimension of the current position; and
    when said mouse pointer is outside said area of any of said display areas, display, by one or more computing systems or controllers, instead of the mouse pointer, a second marker on at least one side border of another display of said at least two displays in a direction said mouse pointer is positioned within the virtual display area extending along a second dimension of the current position.

* * * * *